(12) United States Patent
Boothe et al.

(10) Patent No.: US 8,359,220 B2
(45) Date of Patent: Jan. 22, 2013

(54) TECHNICAL SUPPORT ROUTING AMONG MEMBERS OF A TECHNICAL SUPPORT GROUP

(75) Inventors: Paul A. Boothe, Austin, TX (US); Mioses Cases, Austin, TX (US); Bhyrav M. Mutnury, Austin, TX (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 12/124,772

(22) Filed: May 21, 2008

(65) Prior Publication Data

US 2009/0292579 A1      Nov. 26, 2009

(51) Int. Cl.
*G06Q 10/00* (2012.01)

(52) U.S. Cl. ............... 705/7.14; 705/7.15; 705/7.16; 705/7.21; 705/7.22; 705/7.25

(58) Field of Classification Search ........ 705/7.14–7.16, 705/7.21, 7.22, 7.25
See application file for complete search history.

(56) References Cited

U.S. PATENT DOCUMENTS

| | | | |
|---|---|---|---|
| 6,220,768 B1 * | 4/2001 | Barroux ................. | 709/224 |
| 6,606,304 B1 | 8/2003 | Grinter et al. | |
| 6,615,240 B1 | 9/2003 | Sullivan et al. | |
| 6,798,876 B1 | 9/2004 | Bala | |
| 7,035,808 B1 * | 4/2006 | Ford ......................... | 705/7.14 |
| 7,120,589 B1 | 10/2006 | Szabo et al. | |
| 7,136,448 B1 | 11/2006 | Venkataperumal et al. | |
| 7,146,002 B1 | 12/2006 | Smith et al. | |
| 7,266,734 B2 | 9/2007 | Chavez, Jr. et al. | |
| 2004/0005048 A1 | 1/2004 | Agusta | |
| 2005/0047583 A1 | 3/2005 | Sumner et al. | |
| 2006/0064504 A1 | 3/2006 | Rechterman et al. | |

* cited by examiner

*Primary Examiner* — David Rines
(74) *Attorney, Agent, or Firm* — Edward J. Lenart; Cynthia G. Seal; Biggers & Ohanian, LLP

(57) ABSTRACT

Computer-implemented methods, apparatus and products for technical support routing among members of a technical support group, including maintaining, by a configuration manager, a system configuration history of a user's computer system, the system configuration history including historical records of changes in configuration of the user's computer system; receiving, by a technical support module, a support request identifying a current error that occurred during operation of the user's computer system including receiving information describing the error and the system configuration history of the user's computer system; and routing, by the technical support module automatically without human intervention, the support request to one or more particular members of the technical support group in dependence upon the information describing the error and the system configuration history.

15 Claims, 4 Drawing Sheets

TECHNICAL SUPPORT ROUTING AMONG MEMBERS OF A TECHNICAL SUPPORT GROUP

BACKGROUND OF THE INVENTION

1. Field of the Invention

The field of the invention is data processing, or, more specifically, methods, apparatus, and products for technical support routing among members of a technical support group.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Due to the growing complexity of modern computer systems, users of such computer systems often experience problems during the operation of a computer system. Such a problem may arise from a hardware malfunction, software malfunction, or through user error. When such a problem is unresolved by the user, the user may rely on a technical support group to assist in resolving the problem. When reporting the problem to the technical group, the problem is typically initially addressed by lower levels of support that are unaware of any actions a user may have taken in attempting to resolve the problem prior to reporting the problem. As such, users having advanced technical knowledge or experience often waste significant time and the support group increases cost by duplicating actions already taken by the user. Current methods of routing the problem to a higher level of support include providing automated systems, such as telephone systems, that present a user a multitude of solutions to simple problems before allowing the user to contact a member of the technical support group.

SUMMARY OF THE INVENTION

Computer-implemented methods, apparatus and products for technical support routing among members of a technical support group, including maintaining, by a configuration manager, a system configuration history of a user's computer system, the system configuration history including historical records of changes in configuration of the user's computer system; receiving, by a technical support module, a support request identifying a current error that occurred during operation of the user's computer system including receiving information describing the error and the system configuration history of the user's computer system; and routing, by the technical support module automatically without human intervention, the support request to one or more particular members of the technical support group in dependence upon the information describing the error and the system configuration history.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
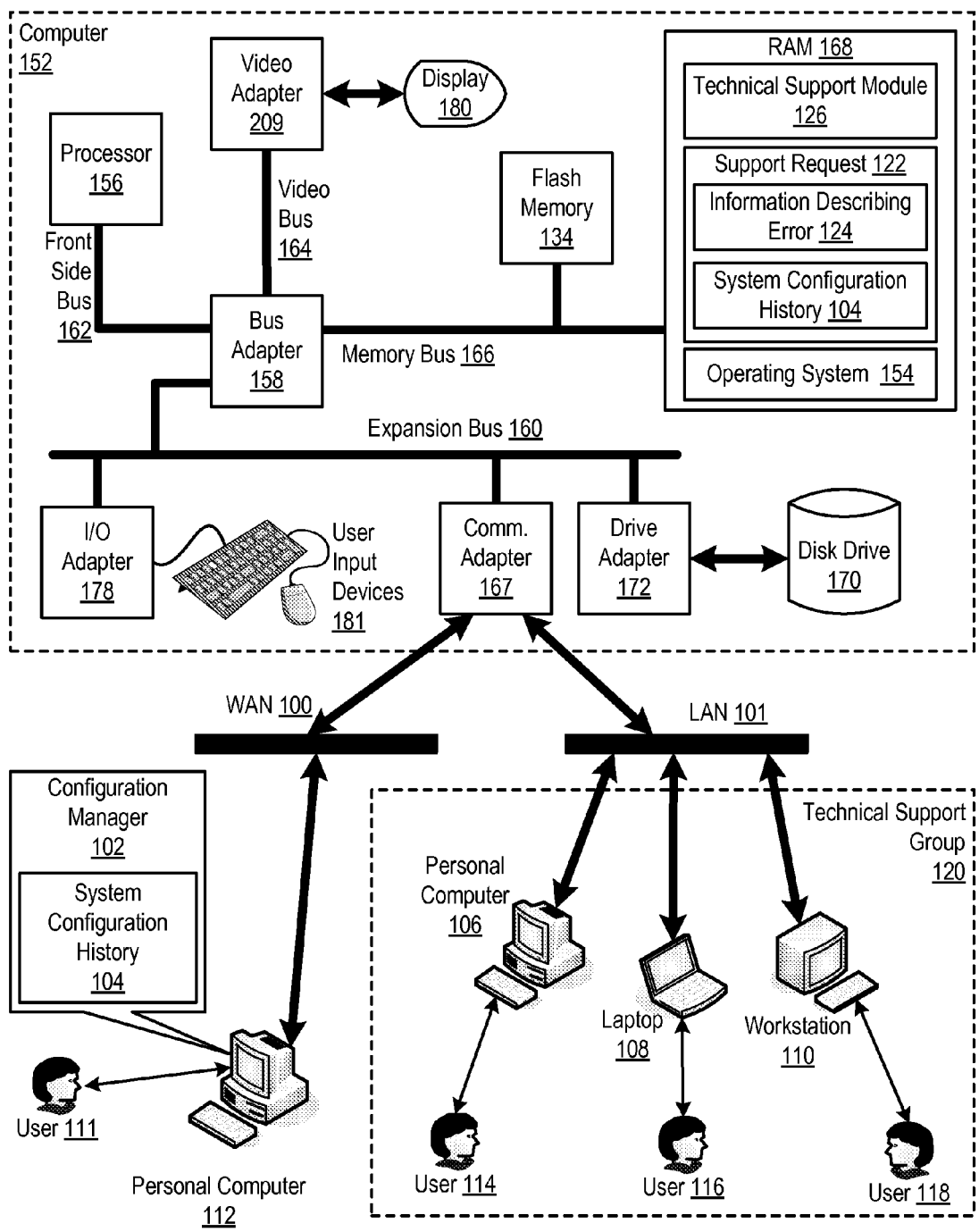
FIG. 1 sets forth a functional block diagram of an exemplary system for technical support routing among members of a technical support group according to embodiments of the present invention.

Exemplary methods, apparatus, and products for technical support routing among members of a technical support group in accordance with the present invention are described with reference to the accompanying drawings, beginning with FIG. 1. FIG. 1 sets forth a functional block diagram of an exemplary system for technical support routing among members of a technical support group (120) according to embodiments of the present invention. Members of a technical support group are individuals tasked with resolving errors that occur during operation of a user's computer system. In the example of FIG. 1 members of the technical support group (120) are depicted as a combination of a user and the user's computer system, user (114) and personal computer (106), user (116) and laptop (108), and user (118) and workstation (110). Such computer systems are an aggregation of hardware and software capable of operation by a user for providing technical support.

Errors that occur during operation of a user's computer system may be errors in execution of computer software, such as, faulty computer program instructions, buffer overflow errors, infinite loops, and the like, errors in hardware of the computer system such as faulty RAM module, a failure of a hard disk drive, an overheated processor, and the like, or an error in user operation of the computer system. That is, an error as the term is used in this specification may refer to a user error even when the user's computer system, the software and hardware, are functioning normally. Examples of user error may include installing malicious software applications, configuring the computer system for data communications incorrectly, using software applications incorrectly, and so on.

In the example of FIG. 1, the technical support group (120) specifically provides technical support services to the user (111) of the personal computer (112). The personal computer (112) includes a configuration manager (102) useful in technical support routing among members of the technical support group (120) according to embodiment of the present invention. The configuration manager (102) is capable of maintaining a system configuration history (104) of the user's (111) computer system (112). Such a system configuration history (104) includes historical records of changes in configuration of the user's computer system. In the example of FIG. 1, the configuration manager may be implemented as a standalone software application, as a software component of an operating system of the user's (111) computer system (112), as a hardware aggregation of synchronous and asynchronous logic operatively connected to a computer processor of the user's computer system, or some combination thereof.

The user (111) of the personal computer (112) is connected for data communications to a computer (152) through a wide area network (100) and the members (114, 116, 118) of the technical support group (120) in the example of FIG. 1 are connected for data communications to the same computer (152) through a local area network (101). The computer (152) is generally useful for implementing technical support routing among members of a technical support group according to embodiments of the present invention.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is technical support module (126), a set of computer program instructions that implements technical support routing among members (114, 116, 118) of a technical support group (120) according to embodiments of the present invention by: receiving a support request (122) identifying a current error that occurred during operation of the user's computer system including receiving information (124) describing the error and the system configuration history (104) of the user's computer system; and routing the support request to one or more particular members (114, 116, 118) of the technical support group (120) in dependence upon the information describing the error and the system configuration history automatically without human intervention.

Also stored in RAM (168) of the computer (152) is an operating system (154). Operating systems useful for technical support routing among members of a technical support group according to embodiments of the present invention include UNIX™, Linux™, Microsoft XP™, Microsoft Vista™, AIX™, IBM's i5/OS™, and others as will occur to those of skill in the art. The operating system (154), graphics module (114), compression profile (120), stream buffer (124) and remote desktop application (132) in the example of FIG. 1 are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that implement technical support routing among members of a technical support group according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the server (102), personal digital assistant ('PDA') (104), mobile phone (106), laptop (108), workstation (110), personal computer (112). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for technical support routing among members of a technical support group according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
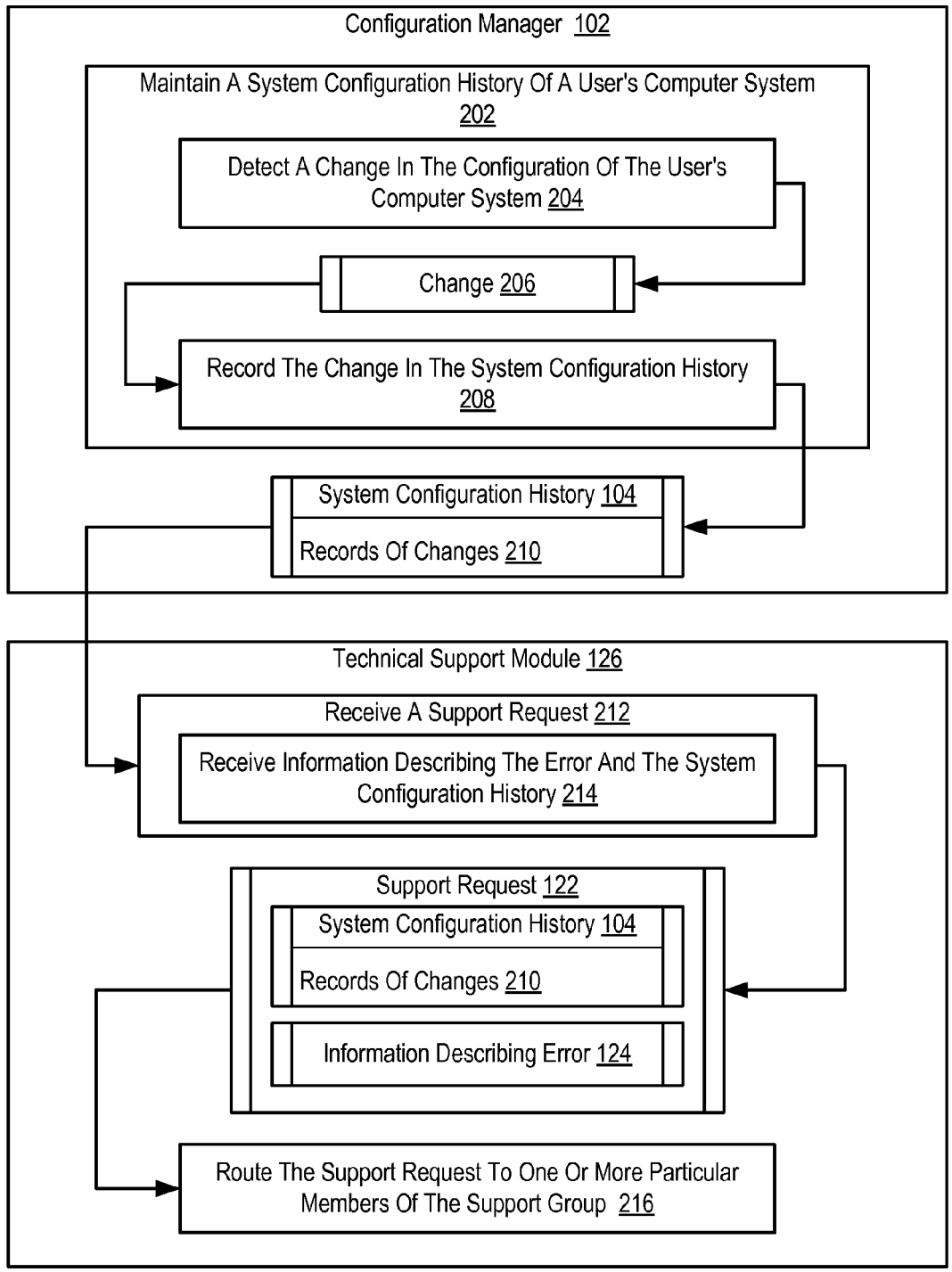
FIG. 2 sets forth a flow chart illustrating an exemplary computer-implemented method for technical support routing among members of a technical support group according to embodiments of the present invention.

For further explanation, FIG. 2 sets forth a flow chart illustrating an exemplary computer-implemented method for technical support routing among members of a technical support group according to embodiments of the present invention. The method of FIG. 2 includes maintaining (202), by a configuration manager (102), a system configuration history (104) of a user's computer system. In the method of FIG. 2, the system configuration history (104) includes historical records (210) of changes in configuration of the user's computer system.

A system configuration history (104) is a data structure including one or more historical records of changes in the configuration of the user's computer system. Such historical records may indicate a time of a change, and describe the change. Such changes may be categorized into categories such as 'hardware changes,' 'software changes,' 'firmware changes,' and so on. Instead of a current snapshot of the configuration of the user's computer system, the system configuration history (104) provides a history of many configurations of the computer system.

In the method of FIG. 2, maintaining (202), by a configuration manager (102), a system configuration history (104) of a user's computer system may be carried out by detecting (204) a change (206) in the configuration of the user's computer system and recording (208) the change in the system configuration history (104). Such changes in the configuration of a user's computer system may be detected by monitoring changes in a computer system registry of applications, monitoring changes in hardware configuration of the computer system such as an addition or removal of a hard disk, RAM module, USB device, and so on, monitoring a log of operating system versions installed on the computer system to identify an OS update, and monitoring a log of firmware versions installed in the computer system to identify a BIOS update, option ROM update, I/O device firmware update and so on.

The method of FIG. 2 also includes receiving (212), by a technical support module (126), a support request (122) identifying a current error that occurred during operation of the user's computer system including receiving (212) information (124) describing the error and the system configuration history (104) of the user's computer system. A support request (122) may be implemented as a data structure, such as a table, list, linked list, array, and the like. Such a support request (122) may be automatically issued, upon an error, by a computer system that experiences the error through an error detection agent executing on the computer system or by a computer user that experiences the error through a support request creation module, a module of computer program instructions that creates support requests, described in more detail below.

Information describing the error may be a user's description of the error. Such information describing the error may include selections by the user of an error type, that is, a category of computer hardware or software affected by the error, a particular error within the category, a time and date on which the error was first experienced, a number of occurrences of the error, and so on as will occur to those of skill in the art. Consider, for example, an error in wireless data communications by a computer system through a data communications network to other computers. Information describing such an error may indicate an error type of 'networking,' a particular 'networking' error of communications loss, a time and data of the first occurrence of the error at May 1, 2008, 17:34:52, a number of occurrences of the error identified as four, and so on. In some embodiments the user may enter the description of the error through a graphical user interface provided by a support request creation module, a module of computer program instructions that creates support requests, the computer program instructions executing on the user's computer, on a web server connected for data communications to the user's computer, or on the same computer on which the technical support module is executing. In fact, in some embodiments such a support request creation module is implemented as a software component of the technical support module.

The method of FIG. 2 also includes routing (216), by the technical support module automatically without human intervention, the support request (122) to one or more particular members of the technical support group in dependence upon the information (124) describing the error and the system configuration history (104). Routing (216) the support request (122) to one or more particular members of the technical support group may include transmitting the support request in one or more data communications packets to the a computer of the one or more particular members across a data communications network in accordance with a data communications protocol, such as the internet protocol ('IP').

Figure 3:
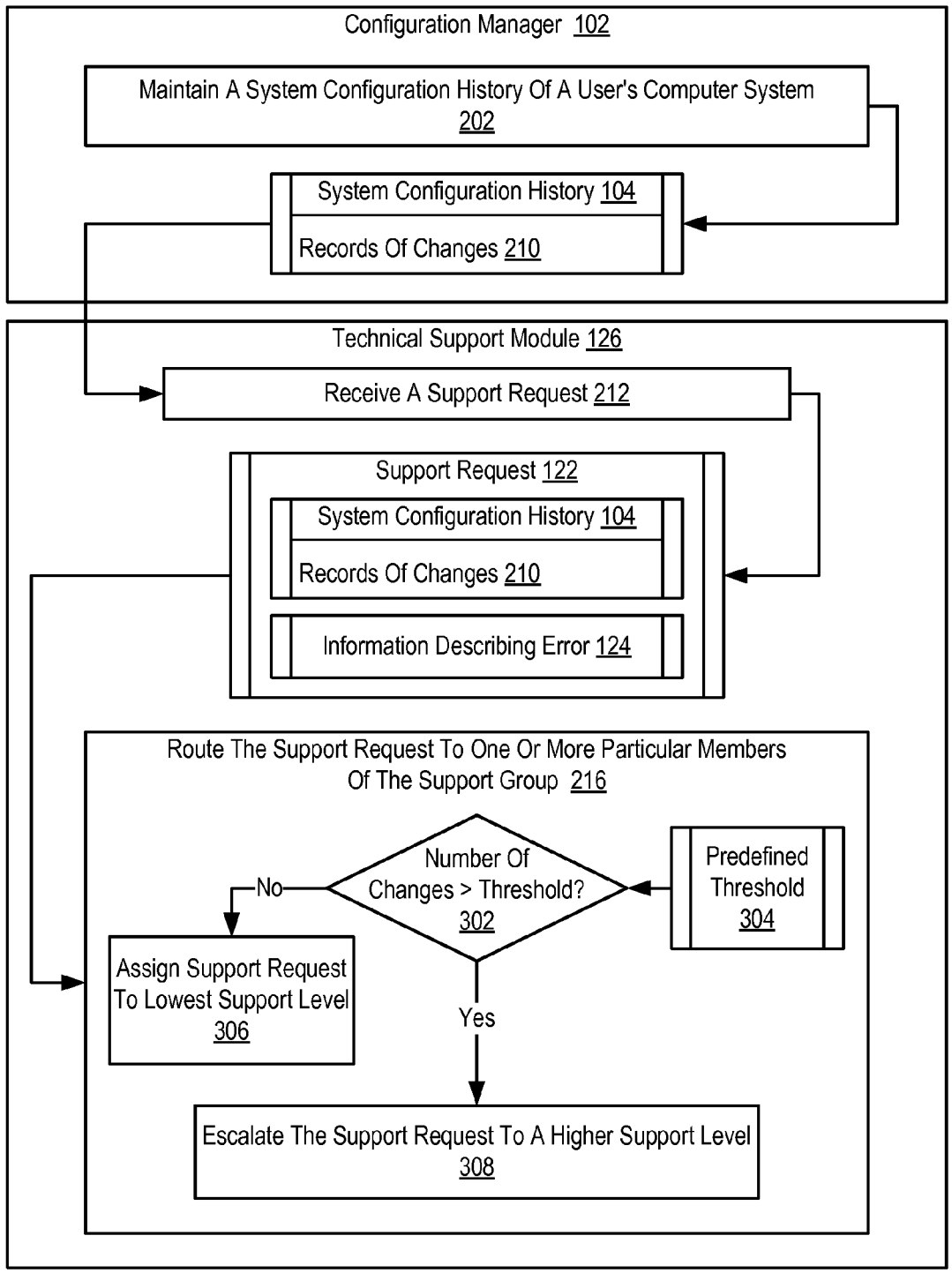
FIG. 3 sets forth a flow chart illustrating a further exemplary computer-implemented method for technical support routing among members of a technical support group according to embodiments of the present invention.

For further explanation, FIG. 3 sets forth a flow chart illustrating a further exemplary computer-implemented method for technical support routing among members of a technical support group according to embodiments of the present invention. The method of FIG. 3 is similar to the method of FIG. 2 in that the method of FIG. 3 includes maintaining (202), by a configuration manager (102), a system configuration history (104) of a user's computer system, the system configuration history (104) including historical records (210) of changes in configuration of the user's computer system; receiving (212), by a technical support module (126), a support request (122) identifying a current error that occurred during operation of the user's computer system including receiving (212) information (124) describing the error and the system configuration history (104) of the user's computer system; and routing (216), by the technical support module automatically without human intervention, the support request (122) to one or more particular members of the technical support group in dependence upon the information (124) describing the error and the system configuration history (104).

The method of FIG. 3 differs from the method of FIG. 2, however, in that in the method of FIG. 3, the technical support group is organized into a plurality of support levels with higher support levels designated to address support requests of greater difficulty. Support requests of greater difficulty may indicate an error regarding obscure technology, an uncommon error, an error having many possible solutions, and so on.

In the method of FIG. 3, routing (216), by the technical support module (126), the support request (122) to one or more particular members of the technical support group includes determining (302) from the system configuration history (104) whether a number of changes in the system configuration relevant to the current error of the user's computer system have been made exceeds a predefined threshold (304). The predefined threshold may be a different number for each error type, that is, different for each category of hardware or software affected by the error.

Changes relevant to the current error may are actions taken by a user to resolve the error before submitting the support request. Examples of changes relevant to a 'wireless networking' error include changing a computer system's Internet Protocol ('IP') address, changing the computer system's subnet mask, changing the computer system's TCP/IP settings, changing the computer system's Wired Equivalent Privacy password, updating the network adapter's firmware, and so on as will occur to those of skill in the art.

Determining (302) from the system configuration history (104) whether a number of changes in the system configuration relevant to the current error of the user's computer system have been made exceeds a predefined threshold (304) may be carried out by counting the number of changes in the system configuration history that occurred in same category of computer hardware or software affected by the error from the time of the first occurrence of the error and comparing that number to the predefined threshold for the category of hardware or software affected by the error. Consider as an example of a predefined threshold for a network hardware and software category, 5 changes. Consider also as an example, a system configuration history identifying 20 different changes to various network hardware and software settings, including such changes as network adapter firmware updates, rollbacks, IP Address changes, Subnet Mask, Network Address Translation settings, TCP/IP settings, WEP passwords, and the like, all of which occurred after the first reported occurrence of the error. In such a case, the technical support module determines that the number of changes in the system configuration exceeds the predefined threshold (304).

In addition to determining (302) from the system configuration history (104) whether a number of changes in the system configuration relevant to the current error of the user's computer system have been made exceeds a predefined threshold (304) the method of FIG. 3 may also include calculating a total relevancy score for the number of changes in the system configuration, and determining whether the relevancy score exceeds a predefined threshold. Calculating a total relevancy score be carried out by assigning for each change in the system configuration, an individual relevancy score and summing the individual relevancy scores for all changes relevant to the current error. An individual relevancy score may describe how relevant a change is with respect to a particular problem. Consider again a wireless networking error. One possible solution to a wireless networking error may be renew an IP address of the network adapter. There are several ways in which a user may renew an IP address, some ways more relevant than others to correcting the current wireless networking error. One way in which a user may renew an IP address is by restarting the computer. Another way to renew an IP address, more relevant to solving a wireless networking error than restarting the computer, is by using an 'ipconfig' command line utility to release and renew the IP address. Although both changes have the same effect of renewing an IP address, restarting the computer may be assigned a lower relevancy score than using the ipconfig command line utility. Those groups of changes more relevant to correcting the current error may be routed to technical support group members in higher levels.

If the number of changes in the system configuration does not exceed the predefined threshold (304) does not exceed the predefined threshold (304), the method of FIG. 3 continues by assigning the support request to one or more particular group members of the lowest level of support. If the number of changes in the system configuration does exceed the predefined threshold (304), however, the method of FIG. 3 continues by escalating (308) the support request to a higher support level. A greater the number of changes in the system configuration that are relevant to the current error, hardware and software affected by the current error, indicates that the user has some knowledge or experience in diagnosing and resolving such errors and has taken some steps, albeit unsuccessful steps, in doing so. Such an error that is not resolved with the knowledge or experience of such a user has a greater likelihood of difficulty and as such should be addressed by one or more member of the technical support group tasked with addressing more difficult errors. In fact, in some embodiments, the higher the number of changes identified, the higher the level to which the technical support module (126) escalates the support request.

Figure 4:
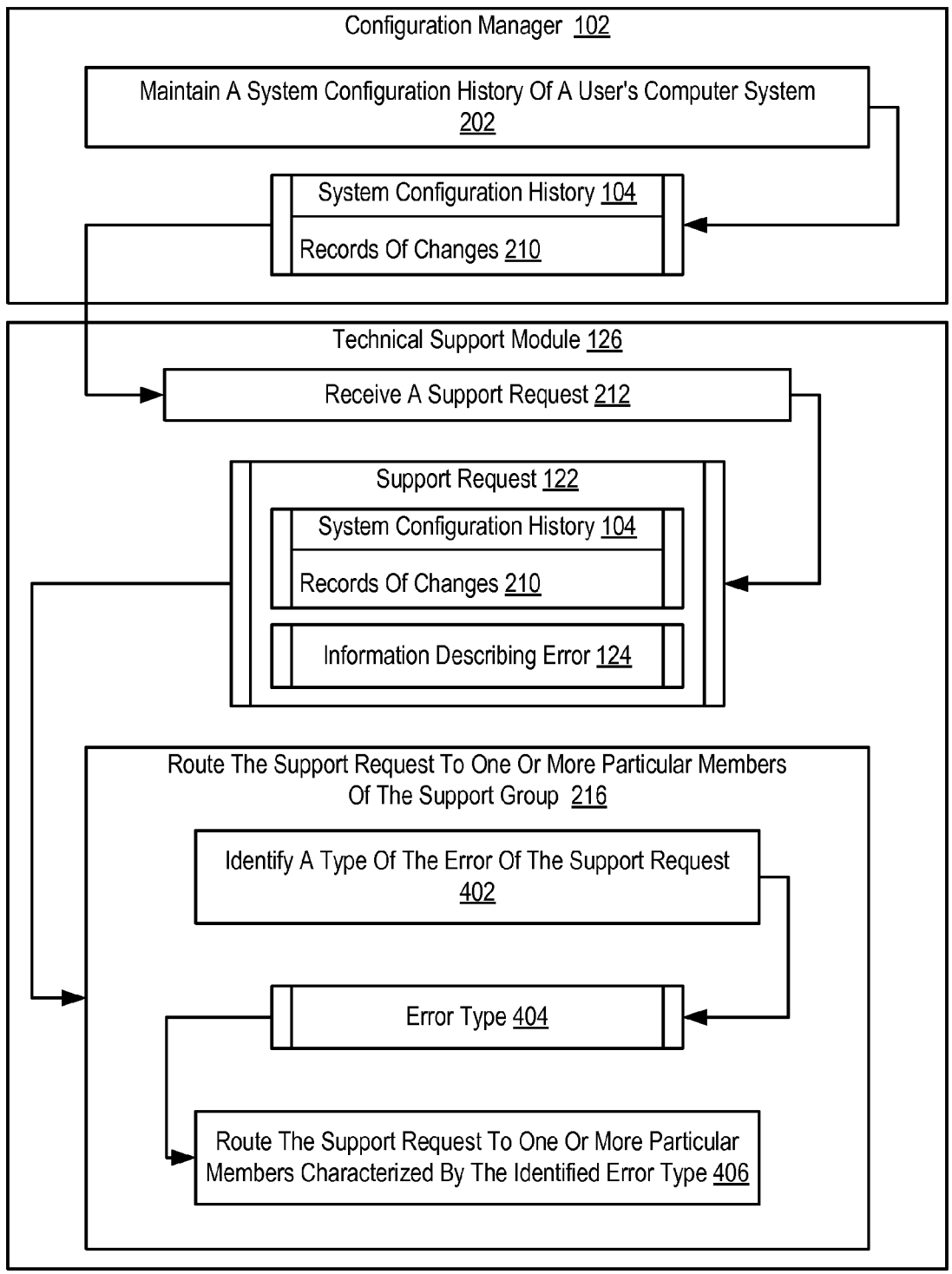
FIG. 4 sets forth a flow chart illustrating a further exemplary computer-implemented method for technical support routing among members of a technical support group according to embodiments of the present invention.

For further explanation, FIG. 4 sets forth a flow chart illustrating a further exemplary computer-implemented method for technical support routing among members of a technical support group according to embodiments of the present invention. The method of FIG. 4 is similar to the method of FIG. 2 in that the method of FIG. 4 includes maintaining (202), by a configuration manager (102), a system configuration history (104) of a user's computer system, the system configuration history (104) including historical records (210) of changes in configuration of the user's computer system; receiving (212), by a technical support module (126), a support request (122) identifying a current error that occurred during operation of the user's computer system including receiving (212) information (124) describing the error and the system configuration history (104) of the user's computer system; and routing (216), by the technical support module automatically without human intervention, the support request (122) to one or more particular members of the technical support group in dependence upon the information (124) describing the error and the system configuration history (104).

The method of FIG. 4 differs from the method of FIG. 2, however, in that in the method of FIG. 4, members of the technical support group are characterized by error type. That is, members of the technical support group are assigned to address errors of particular types. Some technical support group members, for example, may be assigned to address software application errors, some may be assigned to address operating system errors, some may be assigned to address data communications or network errors, some may be assigned to address particular computer hardware errors, and so on. Some members may be characterized by more than one error type. That is, a group member assigned to address operating system errors may also be assigned to address networking errors for example.

In the method of FIG. 2, routing (216), by the technical support module automatically without human intervention, the support request (122) to one or more particular members of the technical support group in dependence upon the information (124) describing the error and the system configuration history (104) includes identifying (402), from the information (124) describing the error and the system configuration history (104), a type (404) of the error of the support request (122) and routing (406) the support request (122) to one or more particular members characterized by the identified error type (404).

Exemplary embodiments of the present invention are described largely in the context of a fully functional computer system for technical support routing among members of a technical support group. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of technical support routing among members of a technical support group, the method comprising:
maintaining, by a first computer, a system configuration history of the first computer, the system configuration history comprising historical records of changes in configuration of the first computer system;
receiving, by a technical support computer, a support request identifying a current error that occurred during operation of the first computer including receiving information describing the error and the system configuration history of the first computer;
routing, by the technical support computer automatically without human intervention, the support request to one or more particular members of the technical support group in dependence upon the information describing the error and the system configuration history, wherein the technical support group is organized into a plurality of support levels with higher support levels designated to address support requests of greater difficulty; and
routing, by the technical support computer, the support request to one or more particular members of the technical support group further comprises:
determining from the system configuration history that a number of changes made in the system configuration relevant to the current error of the first computer exceeds a predefined threshold; and
responsive to said determining that the number of changes made in the system configuration exceeds the predefined threshold, escalating the support request to a higher support level.

2. The method of claim 1 wherein:
members of the technical support group are characterized by error type; and
routing the support request to one or more particular members of the technical support group further comprises:
identifying, from the information describing the error and the system configuration history, a type of the error of the support request; and
routing the support request to one or more particular members characterized by the identified error type.

3. The method of claim 1 wherein the first computer includes a software component of an operating system of the first computer.

4. The method of claim 1 wherein the configuration manager comprises a hardware aggregation of synchronous and asynchronous logic operatively connected to a computer processor of the first computer.

5. The method of claim 1 wherein maintaining, by the first computer, a system configuration history of a user's computer system further comprises:
detecting a change in the configuration of the first computer; and
recording the change in the system configuration history.

6. An apparatus for technical support routing among members of a technical support group, the apparatus comprising a computer processor, a computer memory operatively coupled to the computer processor, the computer memory having disposed within it computer program instructions capable of:
maintaining, by a configuration manager, a system configuration history of a user's computer system, the system configuration history comprising historical records of changes in configuration of the first computer system;
receiving, by a technical support module, a support request identifying a current error that occurred during operation of the user's computer system including receiving information describing the error and the system configuration history of the user's computer;
routing, by the technical support module automatically without human intervention, the support request to one or more particular members of the technical support group in dependence upon the information describing the error and the system configuration history, wherein the technical support group is organized into a plurality of support levels with higher support levels designated to address support requests of greater difficulty; and
routing, by the technical support module, the support request to one or more particular members of the technical support group further comprises:
determining from the system configuration history that a number of changes made in the system configuration relevant to the current error of the first computer exceeds a predefined threshold; and
responsive to said determining that the number of changes made in the system configuration exceeds the predefined threshold, escalating the support request to a higher support level.

7. The apparatus of claim 6 wherein:
members of the technical support group are characterized by error type; and
routing the support request to one or more particular members of the technical support group further comprises:
identifying, from the information describing the error and the system configuration history, a type of the error of the support request; and
routing the support request to one or more particular members characterized by the identified error type.

8. The apparatus of claim 6 wherein the configuration manager comprises a software component of an operating system of the user's computer system.

9. The apparatus of claim 6 wherein the configuration manager comprises a hardware aggregation of synchronous and asynchronous logic operatively connected to a computer processor of the user's computer system.

10. The apparatus of claim 6 wherein maintaining, by a configuration manager, a system configuration history of a user's computer system further comprises:
detecting a change in the configuration of the user's computer system; and
recording the change in the system configuration history.

11. A computer program product for technical support routing among members of a technical support group, the computer program product disposed in a computer readable recordable medium, the computer program product comprising computer program instruction capable of:
maintaining, by a configuration manager, a system configuration history of a user's computer system, the system configuration history comprising historical records of changes in configuration of the first computer system;
receiving, by a technical support module, a support request identifying a current error that occurred during operation of the user's computer system including receiving information describing the error and the system configuration history of the user's computer;
routing, by the technical support module automatically without human intervention, the support request to one or more particular members of the technical support group in dependence upon the information describing the error and the system configuration history, wherein the technical support group is organized into a plurality of support levels with higher support levels designated to address support requests of greater difficulty; and routing, by the technical support module, the support request to one or more particular members of the technical support group further comprises:

determining from the system configuration history that a number of changes made in the system configuration relevant to the current error of the first computer exceeds a predefined threshold; and responsive to said determining that the number of changes made in the system configuration exceeds the predefined threshold, escalating the support request to a higher support level.

12. The computer program product of claim 11 wherein:

members of the technical support group are characterized by error type; and routing the support request to one or more particular members of the technical support group further comprises:

identifying, from the information describing the error and the system configuration history, a type of the error of the support request; and routing the support request to one or more particular members characterized by the identified error type.

13. The computer program product of claim 11 wherein the configuration manager comprises a software component of an operating system of the user's computer system.

14. The computer program product of claim 11 wherein the configuration manager comprises a hardware aggregation of synchronous and asynchronous logic operatively connected to a computer processor of the user's computer system.

15. The computer program product of claim 11 wherein maintaining, by a configuration manager, a system configuration history of a user's computer system further comprises:

detecting a change in the configuration of the user's computer system; and recording the change in the system configuration history.

* * * * *